United States Patent Office 3,274,291
Patented Sept. 20, 1966

---

3,274,291
MIXTURES OF UNSATURATED POLYESTERS AND MONOMERIC ETHYLENE COMPOUNDS CO-POLYMERIZABLE THEREWITH CONTAINING COBALT SALTS AND A MEMBER OF THE GROUP OF ARSINES, STIBENES, AND PHOSPHINES
Karl Raichle, Krefeld-Urdingen, and Hans Rudolph, Krefeld-Bockum, Germany, assignors to Farbenfabriken Bayer Aktiengesellschaft, Leverkusen, Germany, a German corporation
No Drawing. Filed June 8, 1962, Ser. No. 200,947
Claims priority, application Germany, July 5, 1961,
F 34,347
10 Claims. (Cl. 260—863)

The present invention is concerned with new mixtures of unsaturated polyesters and monomeric ethylene compounds copolymerizable therewith which are hardenable at room temperature to give non-green synthetic resins.

It is known to accelerate polymerization reactions, initiated by radical-forming organic peroxides, by the addition of small, catalytically-effective amounts, that is to say: in general from about 0.005 to about 0.1 percent by weight, related to the cobalt content, of cobalt compounds. For this purpose, it is preferred to use the cobalt salts of higher carboxylic acids, such as the naphthenate, resinate, linoleate or octoate, but soluble cobalt salts of partially esterified polycarboxylic acids, such as the monoisooctyl maleate, as well as compounds with chelate-like bound cobalt, such as cobalt acetyl-acetonate and cobalt acetoacetic ester, are also suitable.

The acceleration is, when ketone peroxides, such as the different methyl ethyl ketone, peroxides, methyl isobutyl ketone peroxides, as well as cyclohexanone peroxides, and possibly also mixtures with other peroxides, such as lauroyl peroxide, benzoyl peroxide, cumol hydroperoxide, 1,2,3,4-tetrahydronaphthalene hydroperoxide, tert.-butyl hydroperoxide, di-tert.-butyl peroxide and tert.-butyl perbenzoate, are used, so outstanding that polymerizations are even initiated at room temperature and are terminated without the application of heat.

Because of this advantage, peroxides of the type mentioned are used, to a large extent, in combination with cobalt accelerators, for the hardening of mixtures of unsaturated polyesters, which contain the residues of $\alpha,\beta$-unsaturated dicarboxylic acids, and co-polymerizable monomeric ethylene compounds, said polyesters being commonly called, and also so-called in the following, "polyester resins." Since, however, the peroxides, as a rule, oxidize the initially divalent cobalt to the dark green coloured trivalent cobalt, there is frequently produced the known and feared disadvantage that the hardened products are coloured green, this being the more so the lower lies the hardening temperature, i.e. particularly when hardening is carried out at room temperature and a large surface area is present in comparison with the volume, so that the heat liberated during the hardening can be conducted away or can radiate off, as is, for example, the case in the use of polyester resins in lacquer technology. The green coloration is especially disturbing when bright underlayers are to be coated with polyester resins.

Practically only resins of unsaturated polyesters with high acid numbers (above about 50) and a high content of $\alpha,\beta$-unsaturated dicarboxylic acid residues are free from this fault. However, such resins become cloudy on storage or even separate out as crystals. Such resins are frequently blended with resins of polyesters with a lower content of $\alpha,\beta$-unsaturated dicarboxylic acids in order to render the hardened product elastic but these, however, again become green.

In order to prevent the mentioned green coloration, it has already been suggested to add dipentene, lactic acid, zinc octoate or phosphorous acid or its esters, to the polyester resins. Large numbers of other preferably acidic or acid-forming additives, as well as salts of such acids, such as also cobalt salts, which are soluble in polyester resins, also act in the same way. Such cobalt salts may be used in place of the previously mentioned cobalt accelerators. By way of example, there may be mentioned phosphoric acid, pyrophosphoric acid, phosphorous acid, phosphonic acids, such as styryl phosphonic acid and n-heptylphosphonic acid, phosphinic acids, such as diphenyl phosphinic acid and diisobutylphosphinic acid, phosphonous acids, such as phenyl phosphonous acid and heptyl phosphonous acid, amides or partial esters of these acids, such as phosphoric acid-tris-isobutyl-amide, phosphoric acid-tris-isomayl-amide, di-n-butyl phosphoric acid, mono-n-butyl-phosphoric acid and mono-n-octyl phosphorous acid, phosphorus pentoxide, phosphrus trioxide, phosphorus pentachloride, phosphorus trichloride, phosphorus oxychloride, phosphorus oxybromide and ester halides of acids of phosphorus, such as monobutyl phosphoric acid dichloride and diisobutyl phosphoric acid monochloride; furthermore, corresponding thiophosphorus compounds, such as phosphorus thiochloride, thiophosphoric acid amides, for example, thiophosphoric acid-tris-isobutylamide and thiophosphoric acid-tris-isoamyl amide, and thiophosphoric acid ester halides, such as diethylthiophosphoric acid-chloride and monopropylthiophosphoric acid-dichloride, as well as soluble sulphonic acids, such as di-tert.-butyl-naphthalene-sulphonic acid, and also formic acid, oxalic acid, malonic acid, malic acid, tartaric acid and citric acid, as well as partial esters of the mentioned polybasic carboxylic acids, such as malonic, malic, tartaric and citric acid mono methyl and ethyl ester, and derivatives forming such acids, such as acid chlorides and bromides, for example, oxalyl chloride and bromide.

These compounds which are capable to prevent the green coloration of the hardened products may, if desired, be present in amounts from about 0.001 to about 1.0 percent by weight related to the hardenable mixture.

The removal of the green coloration by such additions is, however, always tied up with a very disturbing reduction of the "reactivity" of the resins, as can easily be determined by, for example, measurement of the gel time, i.e. of the time which passes after the admixing of the peroxide to the resin, which already contains cobalt accelerators, to the gel formation. Especially long gel times are produced when there are used as accelerators the above-mentioned soluble cobalt salts of the acids which are effective against the green colour formation or when polyester resins which do not give green coloured hardened products, amongst which are also to be considered the mentioned resins with high acid number, are stored after admixture with cobalt accelerators.

Since the peroxides react with the cobalt accelerators explosively when in an undiluted state and, when insufficiently diluted, still react with decrepitation, the final user is preferably supplied, for reasons of safety, with resins which already contain cobalt accelerators to which only peroxides still have to be added in order to harden them. In this case, it is, however, unavoidable that resins which have been stored for more or less long periods of time, i.e. resins with very different reactivity produced. Losses of reactivity, however, often result not only in a delay of the hardening but even in the formation of an incompletely hardened product. In any case, considerable working-up difficulties can occur so that, in particular, a modern rationalization working upon an assembly line, is no longer possible.

We have found that the mentioned losses of reactivity of polyester resins yielding non-green colored hardened products can be overcome by the addition of phosphines, arsines and/or stibines.

It is surprising that colorations do not occur again, since such additives, which are effective as promoters, result in a strengthening of the coloration in the case of resins forming green-colored hardened products.

According to U.S. patent specification No. 2,520,601, phosphines of the general formula:

wherein R is an alkyl or aryl radical and $R_1$ and $R_8$ are hydrogen atoms or alkyl radicals, accelerate the polymerization of polyester resins by acyl peroxides, such as benzoyl peroxide, lauroyl peroxide, diacetyl peroxide and acetyl-benzoyl peroxide, in such a manner that it can be carried out without the application of heat. However, quite apart from the fact that the acceleration effect of the phosphines in this case is debatable, as follows from a later publication by Horner (Annalen, 591, 108/1955), our own experiments (cf. following table) show that at least the hardening of polyester resins initiated by ketone peroxides is certainly not accelerated by any means as much as to the extent achieved by cobalt compounds.

eral, sufficient to add 0.01 to 1%, referred to the resin solution. Amounts considerably exceeding this are to be avoided since overdosage can also cause colorations of the hardened products.

The unsaturated polyesters mentioned above are well known in the art and are described, for example, in U.S. Patent No. 2,931,784 to Raymond. They are generally prepared by the reaction of an α-unsaturated, α,β-polycarboxylic acid or anhydride with a glycol. Typical examples of polybasic acids and anhydrides which may be used to prepare the unsaturated polyesters are maleic, fumaric, itacoinic, aconitic, mesaconic, citraconic, ethyl maleic, dichloro maleic acid or anhydride. The foregoing polybasic acids or anhydrides may be esterified with such dihydric alcohols as ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanediol, 1,5-pentanediol. The polyesters may be modified by adding to the esterification reaction other modifying polybasic acids or anhydrides such as, for example, phthalic, terephthalic, isophthalic, succinic, adipic, suberic, acelaic, sebacic and 3,6-endomethylene tetrahydrophthalic acids and anhydrides or their derivatives, such as the halogenated substituted derivatives of the aforementioned acids or anhydrides, examples of which are tetrachlorophthalic and hexachloroendomethylene-tetrahydrophthalic acid. If desired, little amounts of monobasic acids or/and monohydric alcohols, such as propionic acid, butyric acid, saturated and unsaturated higher fatty acids, for instance, palmitic acid, stearic acid, linoleic acid, soya bean oil acid, ricinenic acid and so on, and benzoic acid, as well as amyl alcohol and higher aliphatic alcohols, cyclohexanol, methyl cyclohexanol, may also be used for modifying the polyesters.

A special group of unsaturated polyesters the solutions of which in monomeric ethylene compounds, such as sterene, may be used as air-drying and hardening lacquers are obtained by poly-condensing α,β-unsaturated dicarboxylic acids as mentioned above with hydroxy com-

| Percent peroxide in polyester solution | Percent accelerator in polyester solution | Gel time [1] | Hardened product 24 hours after gelling |
|---|---|---|---|
| 2.0 methyl ethyl ketone peroxide | | 7-8 hours | Soft, crumbling. |
| Do | 1.0 phenyl-dimethyl phosphine | 3-4 hours | Do. |
| Do | Cobalt naphthenate, 0.016 cobalt | 12 minutes | Hard. |

[1] For the determination of the gel time, 10 g. test samples were used in test tubes which, for the removal of the heat of reaction, were placed in a water bath maintained at 20° C. by means of a thermostat.

Therefore, the additional increase in reactivity induced by the addition, according to the invention, of phosphines, arsines and stibines in the case of hardenings initiated by the cobalt accelerator/ketone peroxide system and taking place at room temperature, is all the more surprising.

According to the present invention, there are used compounds which are preferably of low volatility and are as insensitive as possible to air. Examples therefore are triphenyl phosphine, tritolyl phosphine, diphenyl phosphine, dibenzyl phosphine, dioctyl phosphine, phenyl dimethyl phosphine, diethyl naphthyl phosphine, tributyl phosphine, trioctyl phosphine, tris-(hydroxyethyl)-phosphine, methylene-bis-diphenyl phosphine, tricyclopentyl phosphine, triphenyl arsine, tribenzyl arsine, trioctyl arsine, triphenyl stibine, tridiphenyl stibine, trinaphthyl stibine and tritolyl stibine.

The mentioned promoters are preferably added to the polyester resin at room temperature or at a slightly elevated temperature. If the compounds are introduced at room temperature, then they are frequently only completely effective after several days; however, if they are admixed at an elevated temperature, then they immediately reach their full effect.

In order to remove the loss of reactivity, it is, in genpounds containing β,γ-ethylenically unsaturated ether groups as described, for example, in U.S. Patent No. 2,852,482 to Maker and British patent specification No. 810,222 to Farbenfabriken Bayer Aktiengesellschaft. Examples of such ether alcohols are allyl, methallyl, ethallyl, chlorallyl, crotyl and cinnamyl ethers of di- or polyhydric alcohols, such as glycols, glycerine, trimethylolethane, -propane, -butane, pentaerithritol etc., for instance, the glycerol allylethers, trimethylolethane monomethallyl ether, trimethylolpropane mono- and diallyl ether, pentaerithritol mono- and triallyl ether, and glycidallyl ether. The β,γ-unsaturated ether radical may also be introduced into the polyester as an ether acid such as allyloxysuccinic acid and β-allyloxypropionic acid.

The acid number of the unsaturated polyesters may amount, in general, from about 5 to about 80.

The monomeric ethylene compounds copolymerizable with the unsaturated polyesters which maybe used for preparing the "unsaturated polyester resins" mentioned above are likewise well known in the art and are also described, for example, in the aforementioned Raymond Patent No. 2,931,784. Typical representatives of these compounds are, for example, styrene, vinyltoluene, halogenated styrenes and vinyltoluenes, divinyl benzene, vinyl esters, such as vinylacetate, acrylic and methacrylic acids and their derivatives, aliphatic and aromatic allyl, diallyl and triallyl compounds, such as esters and ethers thereof, for instance, allyl acetate, diallyl phthalate, triallyl phosphate, diallyl ether etc.

The ratio of unsaturated polyester to monomeric ethylene compound may, in general, amount from about 10 to 90 to about 90 to 10.

In order to increase the storage stability, the polyester resin can contain known inhibitors, such as p-benzoquinone, 2,5-di-tert.-butyl-quinone, hydroquinone, tert.-butyl-pyrocatechol, 3-methyl-pyrocatechol and 4-ethyl-pyrocatechol, as well as copper compounds, such as copper naphthenate.

The parts given in the following examples are parts by weight. The percentages of the additives refer to the polyester resins. Under the given gel times, there is to be understood the times which pass between the admixing of a peroxide to the cobalt accelerator-containing resin and the gel formation. For the determination of the gel time and for the assessment of the colour of the hardened products, there are used 10 g. samples in test tubes which are kept in a water bath, maintained at 20° C. by means of a thermostat, for the removal of the heat of reaction, until hardening has taken place.

EXAMPLE 1

An unsaturated polyester with an acid number of 44 produced by the condensation of 235 parts maleic anhydride and 828 parts phthalic anhydride with 738 parts butane-1,3-diol, with the addition of 0.5 part hydroquinone, is dissolved in an equal number of parts of styrene. The thus obtained polyester resin is, according to the experiments set out in Table I, hardened in its original form, in the presence of promotors, in the presence of substances for the prevention of green coloration, as well as, according to the invention, in the presence of both additives. By the admixture of a cobalt accelerator thereto, a cobalt content of 0.016% is adjusted and the hardening subsequently initiated after different periods of storage (see Table I, column 5) by the stirring in of peroxide.

If the catalyzed resin, to which has been added, in known manner, 1.4% of a 10% paraffin solution in toluene for the achievement of a surface drying, is put, with the help of a spray gun, on to bleached maple, then, independently of the period of storage, not only the original resin but also the resin modified according to the invention give dry films after 2–3 hours which, in the case of the original resin, are green coloured whereas, in the case of the resin modified according to the invention, are colourless. The resin which is only modified by a promotor admittedly dries within 2 hours but the films obtained are even more strongly coloured than those of the original resin. The resin which is only modified by an additive preventing the green coloration gives, upon testing, films which dry with a delay, depending on the period of storage, which often amounts to several hours.

Table I

| Addition for the inhibition of greening | Promoter | Cobalt accelerator | Peroxide | Storage | Gel time (min.) | Colour of hardened product |
|---|---|---|---|---|---|---|
|  |  | Naphthenate | 2% cyclohexanone peroxide | 0<br>24 hours<br>14 days<br>28 days | 30<br>32<br>31<br>33 | Green.<br>Do.<br>Do.<br>Do. |
|  |  | Octoate | 2% methyl ethyl ketone peroxide. | 0<br>24 hours<br>14 days<br>28 days | 28<br>30<br>29<br>30 | Green.<br>Do.<br>Do.<br>Do. |
|  |  | Naphthenate | 1% cyclohexanone peroxide +%1 tetralinhydroperoxide. | 0<br>24 hours<br>14 days<br>28 days | 60<br>65<br>65<br>65 | Green.<br>Do.<br>Do.<br>Do. |
|  | 0.18% triphenyl phosphine [4] | Naphthenate | 1% cyclohexanone peroxide +1% tetralinhydroperoxide. | 0<br>24 hours<br>14 days<br>28 days | 40<br>37<br>40<br>46 | Dark green.<br>Do.<br>Do.<br>Do. |
|  | 0.18% triphenyl phosphine [4] | Naphthenate | 2% cyclohexanone peroxide | 0<br>24 hours<br>14 days<br>28 days | 22<br>21<br>23<br>24 | Dark green.<br>Do.<br>Do.<br>Do. |
|  | 0.41% triphenyl arsine [4] | Octoate | 2% methyl ethyl ketone peroxide. | 0<br>24 hours<br>14 days<br>28 days | 23<br>24<br>24<br>25 | Dark green.<br>Do.<br>Do.<br>Do. |
|  | 0.45% triphenyl stibine [4] | Ocotate | 2% methyl ethyl ketone peroxide. | 0<br>24 hours<br>14 days<br>28 days | 23<br>23<br>25<br>24 | Dark green.<br>Do.<br>Do.<br>Do. |
| 0.012% phosphoric acid [2] |  | Naphthenate | 2% cyclohexanone peroxide | 0<br>24 hours<br>14 days<br>28 days | 45<br>55<br>80<br>110 | Bright pink.<br>Do.<br>Do.<br>Do. |
| 0.012% phosphoric acid [2] | 0.18% triphenyl phosphine [4] | Naphthenate | 2% cyclohexanone peroxide | 0<br>24 hours<br>14 days<br>28 days | 30<br>32<br>31<br>33 | Bright pink.<br>Do.<br>Do.<br>Do. |
| 0.014% phosphoric pentoxide [2] |  | Naphthenate | 2% cyclohexanone peroxide | 0<br>24 hours<br>14 days<br>28 days | 40<br>100<br>120<br>120 | Bright pink.<br>Do.<br>Do.<br>Do. |

Table I—Continued

| Addition for the inhibition of greening | Promoter | Cobalt accelerator | Peroxide | Storage | Gel time (min.) | Colour of hardened product |
|---|---|---|---|---|---|---|
| 0.014% phosphoric pentoxide [1] | 0.18% triphenyl phosphine [4] | Naphthenate | 2% cyclohexanone peroxide | 0<br>24 hours<br>14 days<br>28 days | 27<br>30<br>30<br>32 | Almost colourless.<br>Do.<br>Do.<br>Bright pink. |
| 0.018% tartaric acid [3] | | Naphthenate | 2% cyclohexanone peroxide | 0<br>24 hours<br>14 days<br>28 days | 45<br>54<br>75<br>90 | Bright pink.<br>Do.<br>Do.<br>Do. |
| 0.018% tartaric acid [3] | 0.18% triphenyl phosphine [4] | Naphthenate | 2% cyclohexanone peroxide | 0<br>24 hours<br>14 days<br>28 days | 28<br>27<br>30<br>30 | Almost colourless.<br>Do.<br>Bright pink.<br>Do. |
| 0.035% maleic acid [2] | | Naphthenate | 2% cyclohexanone peroxide | 0<br>24 hours<br>14 days<br>28 days | 47<br>60<br>70<br>100 | Bright pink.<br>Do.<br>Do.<br>Do. |
| 0.035% maleic acid [2] | 0.18% triphenyl phosphine [4] | Naphthenate | 2% cyclohexanone peroxide | 0<br>24 hours<br>14 days<br>28 days | 34<br>35<br>35<br>35 | Bright yellow, almost colourless.<br>Do.<br>Bright pink.<br>Do. |
| 0.035% maleic acid [2] | | Naphthenate | 1% cyclohexanone peroxide +1% tetralin hydroperoxide. | 0<br>24 hours<br>14 days<br>28 days | 75<br>90<br>120<br>120 | Bright pink.<br>Do.<br>Do.<br>Do. |
| 0.035% maleic acid [2] | 0.18% triphenyl phosphine [4] | Naphthenate | 1% cyclohexanone peroxide +1% tetralin hydroperoxide. | 0<br>24 hours<br>14 days<br>28 days | 65<br>70<br>75<br>75 | Bright pink.<br>Do.<br>Do.<br>Do. |
| 0.07% formic acid [1] | | Naphthenate | 2% cyclohexanone peroxide | 0<br>24 hours<br>14 days<br>28 days | 59<br>75<br>120<br>120 | Bright pink.<br>Do.<br>Do.<br>Do. |
| 0.07% formic acid [1] | 0.18% triphenyl phosphine [4] | Naphthenate | 2% cyclohexanone peroxide | 0<br>24 hours<br>14 days<br>28 days | 34<br>35<br>32<br>31 | Almost colourless.<br>Do.<br>Do.<br>Do. |
| 0.013% phosphorous acid [3] | | Octoate | 2% methyl ethyl ketone peroxide. | 0<br>24 hours<br>14 days<br>38 days | 43<br>55<br>80<br>90 | Bright pink.<br>Do.<br>Do.<br>Do. |
| 0.013% phosphorous acid [3] | 0.18% triphenyl phosphine [4] | Octoate | 2% methyl ethyl ketone peroxide. | 0<br>24 hours<br>14 days<br>28 days | 29<br>30<br>28<br>32 | Almost colourless.<br>Bright pink.<br>Do.<br>Do. |
| 0.013% phosphorous acid [3] | 0.45% triphenyl stibine [4] | Octoate | 2% methyl ethyl ketone peroxide. | 0<br>24 hours<br>14 days<br>28 days | 32<br>32<br>34<br>35 | Almost colourless<br>Do.<br>Do.<br>Bright pink. |
| 0.013% phosphorous acid [3] | 0.41% triphenyl arsine [4] | Octoate | 2% methyl ethyl ketone peroxide. | 0<br>24 hours<br>14 days<br>28 days | 31<br>35<br>34<br>35 | Bright yellow.<br>Almost colourless.<br>Do.<br>Bright pink. |

[1] Added to the polyester resin.
[2] Added to the unsaturated polyester at 120° C.
[3] Added to the unsaturated polyester at 170° C.
[4] Added to the polyester resin at 40° C.

EXAMPLE 2

To the polyester resin described in Example 1, there is added, as accelerator, the cobalt salt of phosphoric acid di-n-butyl ester up to a cobalt concentration of 0.016%. The gel time determined after the stirring in of 2.0% cyclohexanone peroxide amounts to 70–80 minutes; the hardened product obtained is almost colourless to slightly pink coloured. If, up to the time of hardening of the resin, the resin contains a concentration of 0.2% of triphenyl phosphine introduced at 40° C., then there is admittedly also obtained an almost colourless hardened product but the hardening time amounts to only 30 minutes. If the cobalt accelerator-containing resin modified by triphenyl phosphine is hardened first after 14 days' storage, then the same favourable result is obtained.

EXAMPLE 3

The unsaturated polyester described in Example 1 is dissolved 50% in vinyl toluene and 0.15% cobalt naphthenate, corresponding to 0.016% cobalt, is added to the so-obtained polyester resin. If the hardening is initiated by the admixing of 4% of a 50% solution of methyl ethyl ketone peroxide in dimethyl phthalate, then the polyester resin hardens after 30 minutes with the formation of a green coloured hardened product. However, if 0.18% triphenyl phosphine is admixed with the same cobalt-containing polyester resin at 30–40° C. and the hardening initiated by the addition of 4% of a mixture which contains, besides 49.65% methyl ethyl ketone peroxide and 49.65% dimethyl phthalate, also 0.3% phosphoric acid mono-n-butyl ester and 0.4% phosphoric acid di-n-butyl ester for the prevention of green coloration, then an almost colourless to light pink coloured hardened product is obtained with an unaltered gel time. If the addition of the triphenyl phosphine is omitted, then the hardening carried out in the presence of the partial esters of phosphoric acid admittedly also leads to almost colourless to light pink coloured hardened products but the gel time is increased by about 50%.

EXAMPLE 4

An unsaturated polyester with an acid number of 27 produced by the condensation of 340 parts maleic anhydride, 857 parts phthalic anhydride and 337 parts adipic acid with 900 parts propane-1,2-diol, with the addition of 0.29 part hydroquinone, is dissolved in the same number of parts of styrene and the resin obtained adjusted to a cobalt content of 0.015% by the addition of cobalt naphthenate. The hardening takes place after storage periods of different lengths, in each case with the addition of 2.0% cyclohexanone peroxide. In Table II are given the gel times and the colours of the hardened products for the unmodified polyester resin, for the resin admixed with malonic acid monoethyl ester for the prevention of green coloration, as well as for the resin admixed with this semi-ester and, in addition, with triphenyl phosphine according to the invention, in dependance upon the period of storage of the cobalt accelerator-containing resins.

*Table II*

| Malonic[1] acid mono-ethyl ester, percent | Triphenyl[2] phosphine, percent | Storage time | Gel time (min.) | Colour of hardened product |
| --- | --- | --- | --- | --- |
| | | 0 | 19 | Green. |
| | | 24 hours | 20 | Do. |
| | | 14 days | 21 | Bright green. |
| | | 28 days | 22 | Do. |
| 0.75 | | 0 | 22 | Bright pink. |
| | | 24 hours | 24 | Do. |
| | | 14 days | 33 | Do. |
| | | 28 days | 38 | Do. |
| 0.75 | 0.15 | 0 | 18 | Bright pink; colourless. |
| | | 24 hours | 19 | Do. |
| | | 14 days | 21 | Do. |
| | | 28 days | 22 | Do. |

[1] Mixed with the polyester resin.
[2] Mixed with the polyester resin at 70° C. immediately after production.

EXAMPLE 5

The data given in the following Table III show that, by the use according to the invention of phosphine, arsines and stibines, the gel time of a resin, which naturally does not become green, becomes shortened and substantially independent of the storage period of the cobalt accelerator-containing lacquer, without green colourings being caused by these additions. The experiments are carried out with a 47% styrene solution of an unsaturated polyester which has been obtained by the condensation of 282 parts maleic anhydride and 357 parts phthalic anhydride with 398 parts propane-1,2-diol, with the addition of 0.13 part hydroquinone, up to an acid number of 56. Not only the unmodified resin, but also the resin modified according to the invention, contain 0.016% cobalt as naphthenate and, after different periods of storage, are hardened by the admixture of 2.0% cyclohexanone peroxide.

*Table III*

| Promotor | Storage time | Gel time (min.) | Colour of hardened product |
| --- | --- | --- | --- |
| | 0 | 13 | Bright pink. |
| | 24 hours | 15 | Do. |
| | 14 days | 28 | Do. |
| | 28 days | 35 | Do. |
| 0.11% triphenyl phosphine[1] | 0 | 10 | Almost colourless. |
| | 24 hours | 12 | Bright pink. |
| | 14 days | 12 | Do. |
| | 28 days | 14 | Do. |
| 0.09% penyl dimethyl phosphine[1] | 0 | 10 | Almost colourless. |
| | 24 hours | 10 | Bright pink. |
| | 14 days | 11 | Do. |
| | 28 days | 14 | Do. |
| 0.45% tridiphenyl stibine[1] | 0 | 10 | Bright pink. |
| | 24 hours | 10 | Do. |
| | 14 days | 13 | Do. |
| | 28 days | 15 | Do. |
| 0.12% tri-n-butyl phosphine[1] | 0 | 11 | Bright pink. |
| | 24 hours | 11 | Do. |
| | 14 days | 13 | Do. |
| | 28 days | 15 | Do. |
| 0.28% triphenyl arsine[1] | 0 | 10 | Bright pink. |
| | 24 hours | 11 | Do. |
| | 14 days | 14 | Do. |
| | 28 days | 14 | Do. |

[1] Mixed with the polyester resin at 25-35° C.

EXAMPLE 6

An unsaturated polyester with an acid number of 32, obtained by the condensation of 490 parts maleic anhydride and 740 parts phthalic anhydride with 610 parts glycol and 535 parts trimethylol propane diallyl ether with the addition of 0.22 part hydroquinone, are dissolved 45% in styrene and the resin obtained adjusted to a cobalt content of 0.016% by the addition of cobalt naphthenate. Table IV gives the gel time measured after the admixing of 2.0% cyclohexanone peroxide, as well as the colours of the hardened products for the unmodified polyester resin and of the polyester resin modified by partial esters of phosphoric acid, as well as of the polyester resin modified with such esters and, additionally, according to the invention, with triphenyl phosphine. The data are given in dependence upon the length of storage time at 40° C. of the cobalt accelerator-containing resins.

*Table IV*

| Additive for preventing the greening | Triphenyl[1] phosphine, percent | Storage time | Gel time (min.) | Colour of hardened product |
| --- | --- | --- | --- | --- |
| | | 0 | 12 | Green. |
| | | 1 day | 12 | Do. |
| | | 3 days | 11 | Do. |
| | | 7 days | 12 | Do. |
| 0.013% phosphoric acid[2] mono-n-butyl ester+0.017% phosphoric acid[2] di-n-butyl ester. | | 0 | 16 | Bright pink. |
| | | 1 day | 21 | Do. |
| | | 3 days | 30 | Do. |
| | | 7 days | 34 | Do. |
| 0.013% phosphoric acid[2] mono-n-butyl ester+0.017% phosphoric acid[2] di-n-butyl ester. | 0.16 | 0 | 11 | Bright pink. |
| | | 1 day | 13 | Do. |
| | | 3 days | 13 | Do. |
| | | 7 days | 14 | Do. |

[1] Mixed with the polyester resin at 40° C.
[2] Mixed with the polyester resin.

EXAMPLE 7

The 50% styrene solution of an unsaturated polyester with an acid number of 44, obtained by the condensation of 447 parts maleic anhydride and 552 parts phthalic anhydride with 647 parts propane-1,2-diol, with the addition of 0.20 part hydroquinone, is mixed with different amounts of cobalt naphthenate and with partial esters of phosphoric acid against green coloration. The hardening takes place after storage times of different length by the admixing of 0.2% cyclohexanone peroxide. The gel time, as well as the colours of the hardened products, are given in Table V for the mentioned polyester resins and for the resins which contain triphenyl phosphine according to the invention.

*Table V*

| Additive for preventing greening | Triphenyl[1] phosphine, percent | Cobalt content (introduced as naphthenate), percent | Storage time | Gel time (min.) | Colour of the hardened product |
| --- | --- | --- | --- | --- | --- |
| 0.0034% Phosphoric acid mono-n-butyl ester[2] +0.0042% Phosphoric acid di-n-butylester. | | 0.016 | 0 24 hours 14 days 28 days | 25 30 85 90 | Bright pink. Do. Do. Do. |
| 0.01% Phosphoric acid mono-n-butyl ester[2] plus 0.012% Phosphoric acid di-n-butyl ester.[2] | | 0.048 | 0 24 hours 14 days 28 days | 13 14 19 24 | Brown-pink. Do. Pink. Do. |
| 0.0034% Phosphoric acid mono-n-butyl ester[2] plus 0.0042% Phosphoric acid di-n-butyl ester.[2] | 0.15 | 0.016 | 0 24 hours 14 days 28 days | 14 12 14 14 | Almost colourless. Do. Bright pink. Do. |
| 0.01% Phosphoric acid mono-n-butyl ester[2] plus 0.012% Phosphoric acid di-n-butyl ester.[2] | 0.11 | 0.048 | 0 24 hours 14 days 28 days | 9 9 10 10 | Brown-pink. Do. Pink. Do. |

[1] Mixed with the polyester resin at room temperature.
[2] Added to the polyester resin together with the cobalt accelerator.

We claim:

1. A polymerization mixture which is hardenable at room temperature by the addition of a ketone peroxide polymerization initiator comprising:
   (A) An unsaturated polyester prepared from an $\alpha,\beta$-unsaturated dicarboxylic acid and a polyhydric alcohol, said polyester having an acid number below about 50
   (B) A monomeric ethylenically unsaturated compound co-polymerizable therewith
   (C) A cobalt accelerator
   (D) From 0.01 to 0.1 percent by weight of a member selected from the group consisting of phosphines, arsines and stibines and
   (E) An acidic green-coloration inhibitor.

2. A polymerization mixture which is hardenable at room temperature by the addition of a ketone peroxide polymerization initiator comprising:
   (A) An unsaturated polyester prepared from an $\alpha,\beta$-unsaturated dicarboxylic acid and a polyhydric alcohol, said polyester having an acid number above about 50
   (B) A monomeric ethylenically unsaturated compound co-polymerizable therewith
   (C) A cobalt accelerator and
   (D) From 0.01 to 0.1 percent by weight of a member selected from the group consisting of phosphines, arsines and stibines.

3. The polymerization mixture of claim 1 wherein the phosphine is a member selected from the group consisting of triphenyl phosphine, tritolyl phosphine, diphenyl phosphine, dibenzyl phosphine, dioctal phosphine, phenyl dimethyl phosphine, diethyl naphthyl phosphine, tributyl phosphine, trioctal phosphine, tris-(hydroxyethyl)-phosphine, methylene-bis-diphenyl phosphine and tricyclopentyl phosphine, the arsine a member selected from the group consisting of triphenyl-arsine, tribenzyl arsine and trioctyl arsine and the stibine a member selected from the group consisting of triphenyl stibine, tridiphenyl stibine, trinaphthyl stibine and tritolyl stibine.

4. The polymerization mixture of claim 2 wherein the phosphine is a member selected from the group consisting of triphenyl phosphine, tritolyl phosphine, diphenyl phosphine, dibenzyl phosphine, dioctal phosphine, phenyl dimethyl phosphine, diethyl naphthyl phosphine, tributyl phosphine, trioctal phosphine, tris-(hydroxyethyl)-phosphine, methylene-bis-diphenyl phosphine and tricyclopentyl phosphine, the arsine a member selected from the group consisting of triphenyl arsine, tribenzyl arsine and trioctyl arsine and the stibine a member selected from the group consisting of triphenyl stibine, tridiphenyl stibine, trinaphthyl stibine and tritolyl stibine.

5. The polymerization mixture of claim 1 wherein the acidic green-coloration inhibitor is a member selected from the group consisting of dipentene, organic sulfonic acids, organic carboxylic acids, partial esters of organic carboxylic acids, acidic phosphorus compounds, acid-forming phosphorus compounds, acidic thiophosphorus compounds and metal salts of said acidic compounds.

6. The polymerization mixture of claim 1 wherein a phosphine is used.

7. The polymerization mixture of claim 1 wherein an arsine is used.

8. The polymerization mixture of claim 1 wherein a stibine is used.

9. Polymerization products produced from the mixtures according to claim 1.

10. Polymerization products produced from the mixtures according to claim 2.

References Cited by the Examiner

UNITED STATES PATENTS

| 2,520,601 | 8/1950 | Lee | 260—45.4 |
| 2,543,635 | 2/1951 | Loritsch | 260—45.4 |
| 2,652,382 | 9/1953 | Davis | 260—45.4 |
| 3,001,967 | 9/1961 | Willersinn | 260—45.4 |

FOREIGN PATENTS

| 579,190 | 7/1959 | Canada. |
| 790,940 | 2/1958 | Great Britain. |
| 822,713 | 10/1959 | Great Britain. |

OTHER REFERENCES

Behnke et al., German application, 1,130,164, printed May 24, 1962, KL 39b 22–10.

WILLIAM H. SHORT, *Primary Examiner.*

C. A. WENDEL, *Assistant Examiner.*